United States Patent
Shin et al.

(10) Patent No.: US 10,772,157 B2
(45) Date of Patent: Sep. 8, 2020

(54) METHOD FOR PERFORMING RELAY COMMUNICATION AND ELECTRONIC DEVICE THEREOF

(71) Applicant: Samsung Electronics Co., Ltd., Gyeonggi-do (KR)

(72) Inventors: Jiho Shin, Gyeonggi-do (KR); Yi Yang, Gyeonggi-do (KR); Moon-Seok Kang, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 82 days.

(21) Appl. No.: 16/123,664

(22) Filed: Sep. 6, 2018

(65) Prior Publication Data

US 2019/0090308 A1 Mar. 21, 2019

(30) Foreign Application Priority Data

Sep. 15, 2017 (KR) .................. 10-2017-0118585

(51) Int. Cl.
*H04W 88/04* (2009.01)
*H04W 8/18* (2009.01)
*H04W 4/80* (2018.01)
H04W 88/06 (2009.01)
H04W 8/00 (2009.01)

(52) U.S. Cl.
CPC ............ *H04W 88/04* (2013.01); *H04W 4/80* (2018.02); *H04W 8/18* (2013.01); *H04W 8/005* (2013.01); *H04W 88/06* (2013.01)

(58) Field of Classification Search
CPC ......... H04W 88/04; H04W 4/80; H04W 8/18; H04W 8/005; H04W 88/06
See application file for complete search history.

(56) References Cited

U.S. PATENT DOCUMENTS

| | | | | |
|---|---|---|---|---|
| 2013/0331029 A1* | 12/2013 | Tang | .............. | H04W 4/60 455/41.1 |
| 2014/0287683 A1* | 9/2014 | Rankl | .............. | G06Q 20/352 455/41.1 |
| 2015/0131642 A1* | 5/2015 | Amano | .............. | G06F 21/35 370/338 |

(Continued)

*Primary Examiner* — Pao Sinkantarakorn
*Assistant Examiner* — Kabir U Jahangir
(74) *Attorney, Agent, or Firm* — The Farrell Law Firm, P.C.

(57) ABSTRACT

An electronic device includes first communication module establishing communication connection, using first network; second communication module establishing communication connection, using second network; one or more security modules connected to second communication module; and one or more processors connected to first and second communication modules, wherein one or more processors are configured to receive NFC control data and transaction data for NFC service from external electronic device through first communication module, acquire an AID from transaction data for NFC service, determine security module corresponding to AID from one or more security modules, transmit NFC control data and transaction data for NFC service to security module corresponding to AID from one or more security modules through second communication module, and transmit response signal received from security module corresponding to AID from one or more security modules to external electronic device through first communication module.

20 Claims, 11 Drawing Sheets

(56) References Cited

U.S. PATENT DOCUMENTS

| | | | |
|---|---|---|---|
| 2015/0178724 A1* | 6/2015 | Ngo | G06Q 20/32 |
| | | | 705/71 |
| 2016/0086159 A1* | 3/2016 | Golla | G06Q 20/3229 |
| | | | 705/76 |
| 2016/0226767 A1* | 8/2016 | Do Khac | H04L 69/22 |
| 2016/0286342 A1* | 9/2016 | Maddocks | G06Q 20/32 |
| 2017/0013457 A1 | 1/2017 | Polak et al. | |
| 2017/0303077 A1* | 10/2017 | Li | H04B 5/00 |
| 2017/0366925 A1* | 12/2017 | Guo | H04W 4/00 |
| 2019/0320305 A1* | 10/2019 | Mei | H04L 45/021 |
| 2019/0373475 A1* | 12/2019 | Top | H04L 63/1466 |

* cited by examiner

METHOD FOR PERFORMING RELAY COMMUNICATION AND ELECTRONIC DEVICE THEREOF

CROSS-REFERENCE TO RELATED APPLICATION(S)

This application is based on and claims priority under 35 U.S.C. § 119 to Korean Patent Application No. 10-2017-0118585, filed on Sep. 15, 2017, in the Korean Intellectual Property Office, the disclosure of which is incorporated by reference herein in its entirety.

BACKGROUND

1. Field

The present disclosure relates to a method for performing relay communication among electronic devices that use a service using near field communication (NFC), and an electronic device thereof.

2. Description of Related Art

With the development of mobile communication technology, an electronic device may provide not only a calling function but also various data communication functions. For example, electronic devices may provide network-based communication services such as a music service, a moving image service, a digital broadcasting service, a wireless internet service, a short message service (SMS), and a multimedia messaging service (MMS). Further, electronic devices may provide services using NFC other than the network-based communication services. For example, electronic devices may provide a payment service using NFC, a traffic service, and a smartcard service (e.g., a gate pass and an identification (ID) card).

Recently, as electronic devices are increasingly utilized, users may use a plurality of electronic devices. For example, users may use various electronic devices such as a mobile terminal, a wearable device, and a notebook. Accordingly, electronic devices may provide a relay communication function among them so that users may use a service that is provided by another electronic device (e.g., a service using NFC) while using one of the plurality of electronic devices.

In addition, electronic devices may allow for relay communication for all applications that support NFC services when the electronic devices use a service using NFC through relay communication with an external electronic device. Accordingly, the electronic devices must limit a relay communication function for all applications in order to limit relay communication for a certain application.

Further, when an electronic device uses a service based on NFC through relay communication with an external electronic device, the electronic device (e.g., the external electronic device) performing NFC communication and the other electronic device (e.g., the electronic device) processing transaction data for the NFC service are different, so an issue of compatibility may occur, and accordingly, there may be an issue that it is impossible to use the NFC service.

SUMMARY

An aspect of the present disclosure provides a method and device for allowing for relay communication only for certain applications, among applications that support an NFC service.

Another aspect of the present disclosure provides a method and device for updating a first radio frequency (RF) parameter of a first electronic device that performs NFC communication, using a second RF parameter of a second electronic device that processes transaction information for an NFC service.

Another aspect of the present disclosure provides a possibility to satisfy a user's desire for allowing for relay communication only to applications of services that the user wants by allowing relay communication only to certain applications among applications supporting an NFC service.

Another aspect of the present disclosure provides a possibility to prevent an issue of compatibility due to differences in RF parameters of electronic devices performing relay communication by updating a first RF parameter of a first electronic device that performs NFC communication using a second RF parameter of a second electronic device that processes transaction information for an NFC service.

In accordance with an aspect of the present disclosure, an electronic device is provided. The electronic device includes a first communication module configured to establish a communication connection, using a first network; a second communication module configured to establish a communication connection, using a second network; one or more security modules connected to the second communication module; and one or more processors connected to the first communication module and the second communication module, wherein the one or more processors are configured to receive NFC control data and transaction data for an NFC service from an external electronic device through the first communication module, acquire an application identifier (AID) from the transaction data for an NFC service, determine a security module corresponding to the AID from the one or more security modules, transmit the NFC control data and the transaction data for an NFC service to the security module corresponding to the AID from the one or more security modules through the second communication module, and transmit a response signal received from the security module corresponding to the AID from the one or more security modules to the external electronic device through the first communication module.

In accordance with another aspect of the present disclosure, an electronic device is provided. The electronic device includes a first communication module configured to establish a communication connection, using a first network; a second communication module configured to establish a communication connection, using a second network; and one or more processors connected to the first communication module and the second communication module, wherein the one or more processors are configured to receive an AID list and one or more RF parameters from a first external electronic device through the second communication module, update a routing table of the first communication module based on the AID list, and update an RF parameter of the first communication module based on the one or more RF parameters.

In accordance with another aspect of the present disclosure, a method of performing relay communication in an electronic device is provided. The method includes receiving NFC control data and relay transaction data for an NFC service from an external electronic device through a first communication module of the electronic device; acquiring an AID from the transaction data for an NFC service; determining a security module corresponding to the AID of one or more security modules of the electronic device; transmitting the NFC control data and the transaction data for an NFC service to the security module corresponding to the AID of one or more security modules of the electronic device through a second communication module of the electronic device; and transmitting a response signal received from the security module corresponding to the AID of one or more security modules of the electronic device to the external electronic device through the first communication module.

BRIEF DESCRIPTION OF THE DRAWINGS

The above and other aspects, features, and advantages of the present disclosure will be more apparent from the following detailed description, taken in conjunction with the accompanying drawings, in which.

DETAILED DESCRIPTION

Figure 1:
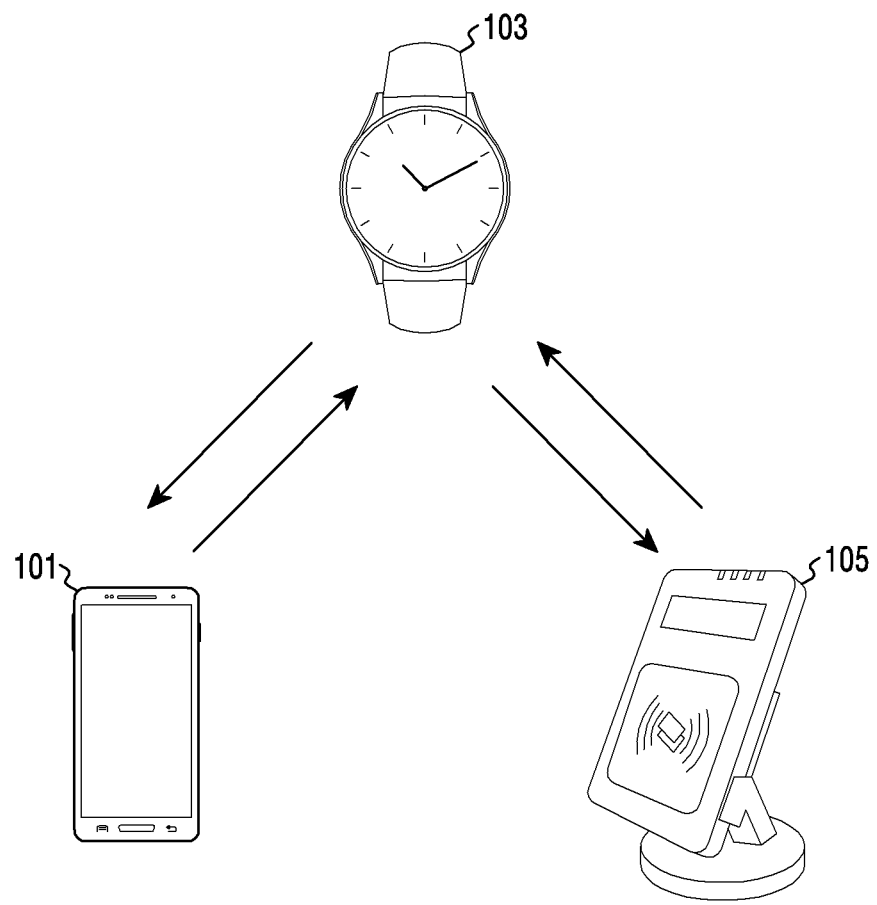
FIG. 1 is an illustration of a system that provides relay communication among electronic devices according to an embodiment.

Hereinafter, various embodiments are described with reference to the accompanying drawings. However, it should be understood that there is no intent to limit the present disclosure to the particular forms disclosed herein; rather, the present disclosure is intended to be construed to cover various modifications, equivalents, and/or alternatives of the embodiments. In describing the accompanying drawings, similar reference numerals may be used to designate similar constituent elements. Various embodiments disclosed herein are provided merely to easily describe technical details of the present disclosure and to facilitate understanding of the present disclosure, but are not intended to limit the scope of the present disclosure. Therefore, it is intended that all modifications and changes or modified and changed forms based on the present disclosure fall within the scope of the present disclosure as defined by the appended claims and their equivalents.

FIG. 1 is an illustration of a system that provides relay communication among electronic devices according to an embodiment.

Referring to FIG. 1, the system may include a first electronic device 101 (e.g., a mobile terminal), a second electronic device 103 (e.g., a wearable device), a third electronic device 105 (e.g., a point of sale (POS) terminal) etc.

According to an embodiment, the first electronic device 101 and the second electronic device 103 may each establish a communication connection. For example, the first electronic device 101 may establish a communication connection with the second electronic device 103 using Bluetooth. When there is a need for a certain application for establishing a communication connection with the second electronic device 103, an application related to the second electronic device 103 may be installed in advance in the first electronic device 101. The first electronic device 101 may establish a communication connection with the second electronic device 103 using the installed application.

According to an embodiment, the first electronic device 101 and the second electronic device 103 may set a service to be allowed for relay transaction. For example, the first electronic device 101 may provide an AID list including information related to an application (e.g., a credit card application, a transportation card application, or an ID application) to be allowed for relay transaction of applications supporting an NFC service, and an RF parameter of a security module (e.g., a main processor (e.g., an application processor), an embedded secure element (eSE), or a subscriber identification module (SIM) to the second electronic device 103. The second electronic device 103 may update an RF parameter of an NFC communication module using the information received from the first electronic device 101. Accordingly, the second electronic device 103 may even establish an NFC communication connection with an external electronic device (e.g., the third electronic device 105) that requires the RF parameter of the first electronic device 101 to use the NFC service that is supported by the first electronic device 101. The AIDs and AID list may be created from the information included in applications installed in the first electronic device 101. Security modules may each include one or more RF parameters (e.g., one or more of a type A RF parameter, a type B RF parameter, a type B' RF parameter, and a type F RF parameter). The RF parameter may be used for establishing an NFC communication (e.g., International Standards Organization (ISO) 14443-4 protocol) connection with an external electronic device.

According to an embodiment, the second electronic device 103 may establish an NFC communication connection with the third electronic device 105 when approaching the third electronic device 105 to use an NFC service (e.g., a credit card service, a transportation card service, or an entrance service). For example, when approaching the third electronic device 105, the second electronic device 103 may be connected with the third electronic device 105 in accordance with an ISO-14443-4 protocol, using the RF parameter of the NFC communication module updated based on the information received from the first electronic device 101. When the second electronic device 103 is connected with the third electronic device 105 in accordance with the ISO 14443-4 protocol, the second electronic device 103 may receive the transaction data for the NFC service from the third electronic device 105.

According to an embodiment, the second electronic device 103 may transmit the transaction data for the NFC service received from the third electronic device 105 to the first electronic device 101. The second electronic device 103 may transmit the transaction data for the NFC service to the first electronic device 101, for example, using NFC (e.g., Bluetooth). The second electronic device 103 may also transmit NFC control data defined in European Telecommunications Standards Institute technical specification (ETSI TS) 102 622 to activate the application corresponding to the NFC service to the first electronic device 101, when transmitting the transaction data for the NFC service.

According to an embodiment, when receiving the NFC control data and the transaction data for the NFC service from the second electronic device 103, the first electronic device 101 may create and transmit response signals for the received signals to the second electronic device 103. For example, when receiving transaction data related to a transportation card service, the first electronic device 101 may provide NFC control data and transaction data for the NFC service to a security module (e.g., a SIM) including a transportation card application. The first electronic device 101 may transmit a response signal created by the security module including the transportation card application to the second electronic device 103. In this case, the second electronic device 103 may perform relay transaction operation by transmitting the response signal received from the first electronic device 101 to the third electronic device 105.

According to an embodiment, when moving a predetermined distance or more away from the third electronic device 105, the second electronic device 103 may remove the communication connection with the third electronic device 105. When the communication connection with the third electronic device 105 is removed, the second electronic device 103 may transmit NFC control data defined in ETSI TS 102 622 to inactivate an application corresponding to the NFC service to the first electronic device 101.

Figure 2:
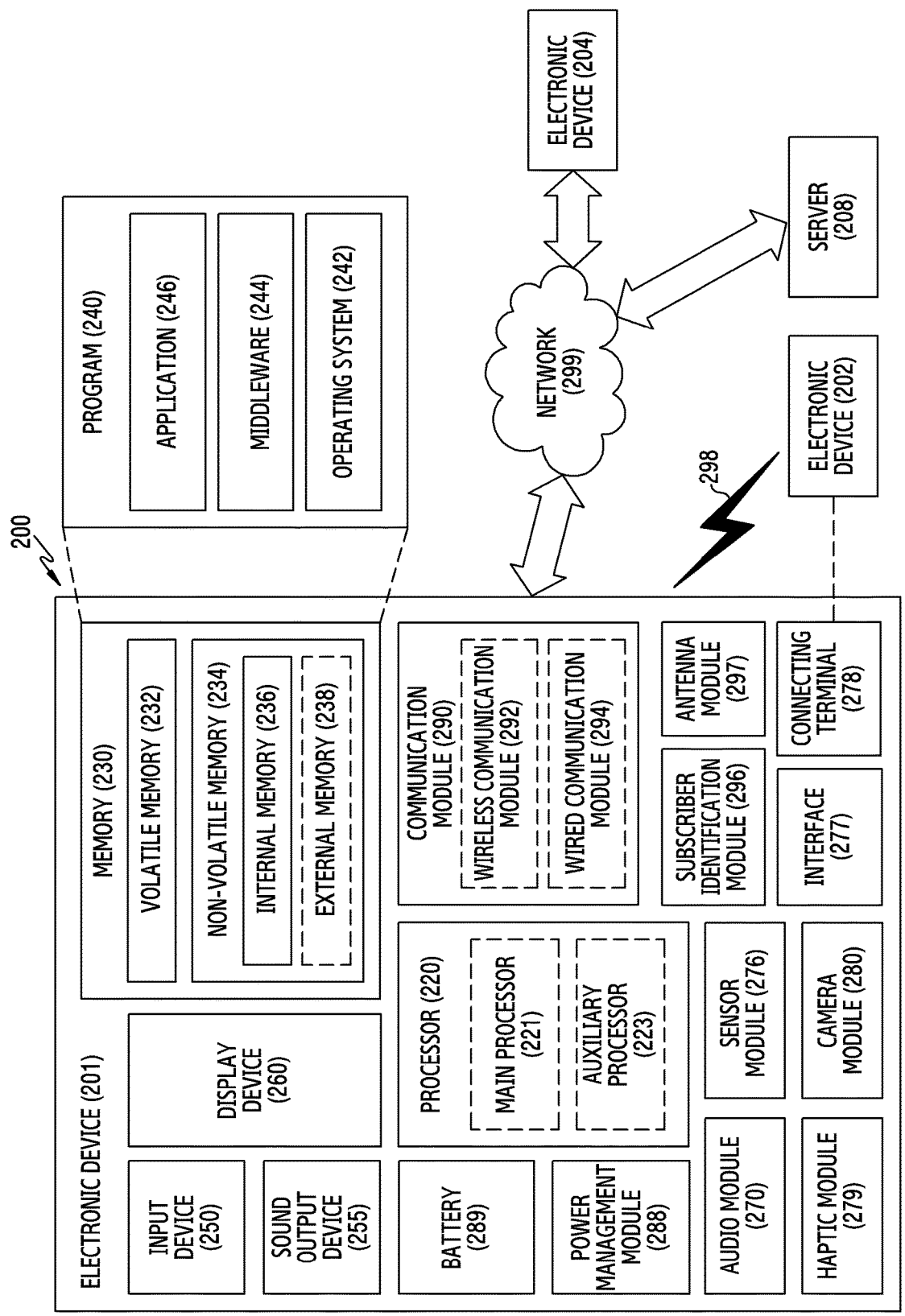
FIG. 2 is a block diagram of an electronic device in a network environment according to an embodiment.

FIG. 2 is a block diagram of an electronic device 201 in a network environment 200 according to an embodiment.

Referring to FIG. 2, the electronic device 201 in the network environment 200 may communicate with an electronic device 202 through a first network 298 (e.g. NFC) or may communicate with an electronic device 204 or a server 208 through a second network 299 (e.g., long distance wireless communication). According to an embodiment, the electronic device 201 may communicate with the electronic device 204 through the server 208. The electronic device 201 may include a processor 220, memory 230, an input device 250, a sound output device 255, a display device 260, an audio module 270, a sensor module 276, an interface 277, a haptic module 279, a camera module 280, a power management module 288, a battery 289, a communication module 290, a subscriber identification module 296, and an antenna module 297. In the electronic device 201, one or more of the components (e.g., the display device 260 or the camera module 280) may be removed or another component may be added. For example, some components may be integrated such as the sensor module 276 (e.g., a fingerprint sensor, an iris sensor, or an illumination sensor) embedded in the display device 260 (e.g., a display).

The processor 220, for example, may control one or more other components (e.g., a hardware or software component) of the electronic device 201 connected to the processor 220 by executing software (e.g., a program 240) and may process and calculate various data. The processor 220 may load and process commands or data received from another component (e.g., the sensor module 276 or the communication module 290) in a volatile memory 232, and may store the resultant data in a nonvolatile memory 234. According to an embodiment, the processor 220 may include a main processor 221 (e.g., a central processing unit (CPU) or an application processor (AP)) and an auxiliary processor 223 (e.g., a graphic processor, an image signal processor, a sensor hub processor, or a communication processor) that is operated independently from the main processor 221 and, additionally or alternatively, uses less power than the main processor 221 or is specified for predetermined functions. The auxiliary processor 223 may be operated separately from the main processor 221 or may be embedded and operated within the main processor 221.

In this case, the coprocessor 223 may control at least some of the functions or states related to one or more of the components (e.g., the display device 260, the sensor module 276, or the communication module 290) of the electronic device 201, for example, instead of the main processor 221 when the main processor 221 is in an inactivated (e.g., sleep) state or together with the main processor 221 when the main processor 221 is in an activated state (e.g., in operation for executing an application). According to an embodiment, the auxiliary processor 223 (e.g., an image signal processor or a communication processor) may be implemented as a partial component of another functionally related component (e.g., the camera module 280 or the communication module 290). The memory 230 may store various data, for example, software (e.g., the program 240) that are used by one or more components (e.g., the processor 220 or the sensor module 276) of the electronic device 201, and input data or output data for commands related to the software. The memory 230 may include a volatile memory 232 and/or a nonvolatile memory 234.

The program 240, which is software stored in the memory 230, for example, may include an operating system 242, middleware 244, or an application 246.

The input device 250, which is a device for receiving commands or data to be used by components (e.g., the processor 220) from the outside (e.g., a user) of the electronic device 201, may include, for example, a microphone, a mouse, or a keyboard.

The sound output device 255, which is a device for outputting sound signals to the outside of the electronic device 201, for example, may include a speaker that is used for common purposes such as playing of multimedia or recorded sounds, and a receiver that is used only for receiving a telephone call. According to an embodiment, the receiver may be formed integrally with or separately from the speaker.

The display device 260, which is a device for visually showing information to a user of the electronic device 201, for example, may include a display, a hologram device, or a projector and a control circuit for controlling the corresponding device. According to an embodiment, the display device 260 may include a touch sensor or a pressure sensor that may measure the intensity of pressure by a touch.

The audio module 270 may convert a sound and an electrical signal into each other. According to an embodiment, the audio module 270 may acquire a sound through the input device 250 or may output a sound through the electronic device 202 (e.g., a speaker or a headphone) connected to the sound output device 255 or the electronic device 201 through a wire or wirelessly.

The sensor module 276 may generate an electrical signal or a data value corresponding to the operational state (e.g., power or temperature) in the electronic device 201 or an external environmental state. The sensor module 276, for example, may include a gesture sensor, a gyro sensor, a barometer sensor, a magnetic sensor, an acceleration sensor, a grip sensor, a proximity sensor, a color sensor, an infrared (IR) sensor, a biosensor, a temperature sensor, a humidity sensor, or an illumination sensor.

The interface 277 may support a predetermined protocol that allows for connection to the electronic device 202 through a wire or wirelessly. According to an embodiment, the interface 277 may include a high definition multimedia interface (HDMI), a universal serial bus (USB) interface, a secure digital (SD) card interface, or an audio interface.

A connection terminal 278 may include a connector that may physically connect the electronic device 201 with an external electronic device (e.g., the electronic device 202), such as an HDMI connector, a USB connector, an SD card connector, or an audio connector (e.g., a headphone connector).

The haptic module 279 may convert an electrical signal into a mechanical stimulus (e.g. a vibration or a movement) or an electrical stimulus that a user may recognize through the sense of touch or the sensation of movement. The haptic module 279, for example, may include a motor, a piezoelectric device, or an electrical stimulator.

The camera module 280 may take still images and record moving images. According to an embodiment, the camera module 280 may include one or more lenses, an image sensor, an image signal sensor, or a flash.

The power management module 288, which is a module for managing the power that is supplied to the electronic device 201, for example, may be at least a part of a power management integrated circuit (PMIC).

The battery 289, which is a device for supplying power to one or more components of the electronic device 201, for example, may include a primary battery that is not rechargeable, a secondary battery that is rechargeable, or a fuel cell.

The communication module 290 may establish a wire or wireless communication channel between the electronic device 201 and the electronic device 202, the electronic device 204, or the server 208, and may support communication through the established communication channel. The communication module 290 may include one or more communication processors that support wired communication or wireless communication that is operated independently from the processor 220 (e.g., an AP). According to an embodiment, the communication module 290 may include a wireless communication module 292 (e.g., a cellular communication module, a NFC module, or a global navigation satellite system (GNSS) communication module) or a wired communication module 294 (e.g., a local area network (LAN) communication module or a power line communication module). Further, the communication module 290 may communicate with an external electronic device through the first network 298 (e.g., a LAN such as Bluetooth, wireless fidelity (WiFi) direct or an Infrared Data Association (IrDA) standard) or through the second network 299 (e.g., a wide area network such as a cellular network, the internet, or a computer network (e.g., a LAN or a wide area network (WAN)), using the corresponding network. The various communication modules 290 described above may be implemented in one integrated circuit (or chip) or separate chips.

According to an embodiment, the wireless communication module 292 may identify and authenticate the electronic device 201 in a communication network, using user information stored in the subscriber identification module 296.

The antenna module 297 may include one or more antennas for transmitting or receiving signals or power to or from the outside. According to an embodiment, the communication module 290 (e.g., the wireless communication module 292) may transmit or receive signals to or from an external electronic device through an antenna suitable for the communication method.

Some of the components may be connected to each other and exchange signals (e.g., commands or data) with each other through communication methods among peripheral devices (e.g., a bus, a general purpose input/output (GPIO), a serial peripheral interface (SPI), or a mobile industry processor interface (MIPI).

According to an embodiment, commands or data may be transmitted or received between the electronic device 201 and the external electronic device 204 through the server 208 connected to the second network 299. The electronic devices 202 and 204 may be the same kind of device as the electronic device 201, or may be different therefrom. All or some of the operations of the electronic device 201 may be performed by another one or a plurality of external electronic devices. When the electronic device 201 must perform a function or service automatically or due to a request, the electronic device 201 may request at least a partial function related to the function or service from an external electronic device additionally or instead of performing the function or service itself. The external electronic device receiving the request may perform the requested function or an additional function and transmit the result to the electronic device 201. The electronic device 201 may provide the requested function or service based on the received result or by additionally processing the received result. In this case, for example, cloud computing, distributed computing, or client-server computing may be used.

Figure 3:
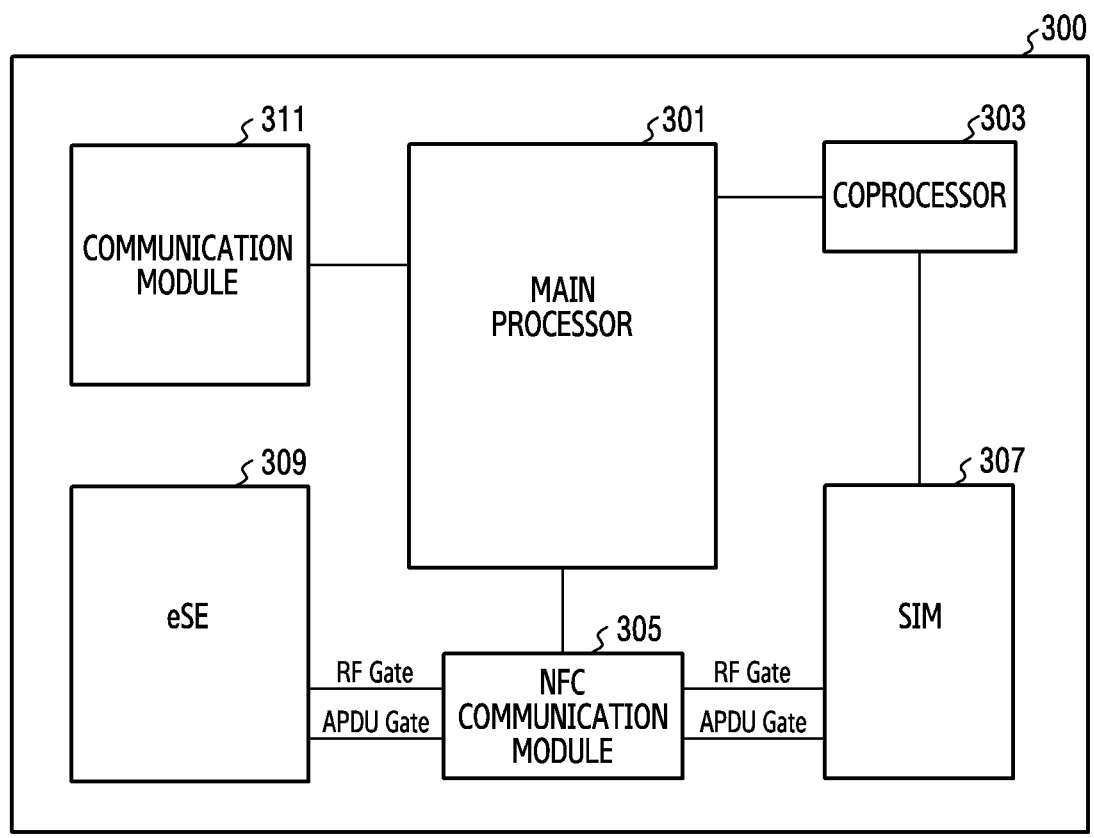
FIG. 3 is a block diagram of an electronic device according to an embodiment.

FIG. 3 is a block diagram of an electronic device according to an embodiment.

Referring to FIG. 3, an electronic device 300 (e.g., the first electronic device 101 or the second electronic device 103) may include one or more of a main processor 301 (e.g., the main processor 221), a coprocessor 303 (e.g., the auxiliary processor 223), an NFC communication module 305, a SIM 307 (e.g., the subscriber identification module 296), an eSE 309, and a communication module 311.

According to an embodiment, the main processor 301 (e.g., the application processor of the first electronic device 101 or the second electronic device 103) may control a plurality of hardware or software components connected to the main processor 301 by executing an operating system or applications and may process and calculate various data including multimedia data.

According to an embodiment, the main processor 301 may establish a communication connection with an external electronic device 103 through the communication module 311. For example, the main processor 301 may search for one or more external electronic devices disposed around the electronic device 300 through the communication module 311. The main processor 301 may establish an NFC connection (e.g., Bluetooth, ZigBee, or WiFi direct communication connection) with an external electronic device selected by user input of the found one or more external electronic devices through the communication module 311.

According to an embodiment, the main processor 301 may set a service to be allowed for relay transaction. For example, the main processor 301 may transmit an AID list including one or more AIDs selected from one or more applications supporting an NFC service by a user and an RF parameter for a security module (e.g., the main processor 301, the SIM 307, the eSE 309) including the application selected by the user to an external electronic device connected for communication with the electronic device 300. Each security module may have a plurality of RF parameters. For example, for each security module, there may be a type A RF parameter that is used for establishing an NFC communication connection in a type A NFC communication method and a type B RF parameter that is used for establishing an NFC communication connection in a type B NFC communication method.

According to an embodiment, the main processor 301 may receive transaction data for NFC control and an NFC service from an external electronic device through the communication module 311. The main processor 301 may recognize an AID from the received transaction data for the NFC service. The main processor 301 may transmit the received NFC control data and transaction data for the NFC service to the NFC communication module 305. When receiving a response signal to the transaction data for the NFC service from the NFC communication module 305, the main processor 301 may transmit the response signal to an external electronic device, using the communication module 311.

According to an embodiment, the main processor 301 may receive an AID list and one or more RF parameters from an external electronic device 101 through the communication module 311. The main processor 301 may update a routing table of the NFC communication module 305, using the received AID list. The main processor 310 may update the RF parameter of the NFC communication module 305, using the received AID list and one or more RF parameters.

According to an embodiment, the main processor 301 may include one or more applications (e.g., a host card emulation (HCE) application) that processes received data when receiving transaction data for an NFC service from the NFC communication module 305.

According to an embodiment, the coprocessor 303 (e.g., the communication application of the first electronic device 101 or the second electronic device 103) may manage a data link and change a communication protocol in communication of other electronic devices connected to the electronic device 300 through a network. The coprocessor 303 may recognize and authenticate the electronic device 300 in a communication network, using the SIM 307. The coprocessor 303 may provide services such as voice calls, video calls, text messaging, or packet data to a user. Although the main processor 310 and the coprocessor 303 are shown as separate components in FIG. 3, the coprocessor 303 may be included in the main processor 301.

According to an embodiment, the NFC communication module 305 may receive a signal (e.g., a signal including one or more of NFC control data and transaction data for an NFC service) from the main processor 301 and may transmit the received signal to an external electronic device 103. The NFC communication module 305 may receive a signal (e.g., a signal including the transaction data for an NFC service) transmitted out of the external electronic device 103.

According to an embodiment, the NFC communication module 305 may receive NFC control data and transaction data for an NFC service from the main processor 301. The NFC control data and the transaction data for an NFC service may be data received from external electronic devices through relay communication. The NFC communication module 305 may transmit the received data to a security module including an application that may process the received data. For example, when the security module including an application that may process the received data is the eSE 309, the NFC communication module 305 may transmit the data received from the main processor 301 to the eSE 309 through an RF gate. That is, by providing data related to an NFC service received through relay communication to the security module through the RF gate that is the path through which data received by contactless communication is provided, the NFC communication module 305 may perform an operation similar to the operation of providing data related to an NFC service directly received from an external electronic device to the security module through the RF gate. For example, a security module may not normally process data when receiving data related to an NFC service through a gate (e.g., an application protocol data unit (APDU) gate) other than an RF gate. The NFC communication module 305 of the electronic device 300 may prevent the issue that data is not normally processed by the security module, by transmitting data related to an NFC service to the security module through the RF gate. The NFC communication module 305 may provide data related to the NFC service received through relay communication to the security module through an APDU gate that is the path through which data received by contact communication from an external electronic device is provided.

According to an embodiment, when the electronic device 300 approaches an external electronic device, the NFC communication module 305 may establish a communication connection with the external electronic device. For example, when the electronic device 300 approaches an external electronic device, the NFC communication module 305 may connect the external electronic device in accordance with the ISO 14443-4 protocol, using the RF parameter of the NFC communication module 305. The RF parameter of the NFC communication module 305 may be a parameter updated based on the AID list and one or more RF parameters received from the external electronic device 101.

According to an embodiment, the SIM 307 is connected to the NFC communication module 305 and the coprocessor 303 and may include one or more applications (e.g., an applet) that process transaction data for an NFC service (e.g., payment data). Accordingly, when NFC control data and transaction data for an NFC service are received through the RF gate or the APDU gate from the NFC communication module 305 or when NFC control data and transaction data for an NFC service are received through the main processor 301 and the coprocessor 303, the SIM 307 may generate a response signal to the transaction data for an NFC service. When NFC control data and transaction data for an NFC service are received through the RF gate or the APDU gate, the SIM 307 may transmit the generated response signal to the NFC communication module 305 through the RF gate or the APDU gate. When NFC control data and transaction data for an NFC service are received through the main processor 301 and the coprocessor 303, the SIM 307 may transmit the generated response signal to the coprocessor 303. In this case, the coprocessor 303 may provide the received response signal to the main processor 301.

According to an embodiment, the eSE 309 is connected to the NFC communication module 305 through the RF gate or the APDU gate and may include one or more applications (e.g., an applet) that processes transaction data for an NFC service (e.g., payment data). Accordingly, when NFC control data and transaction data for an NFC service are received through the RF gate (or the APDU gate) from the NFC communication module 305, the eSE 309 may generate a response signal to the transaction data for an NFC service and transmit the response signal to the NFC communication module 305 through the RF gate or the APDU gate.

According to an embodiment, the communication module 311 may establish a communication connection with an external electronic device. For example, the communication module 311 may establish a communication connection with an external electronic device, using an NFC network such as Bluetooth, ZigBee, WiFi direct, or an IrDA standard.

According to an embodiment, an electronic device may include a first communication module configured to establish a communication connection, using a first network, and a second communication module configured to establish a communication connection, using a second network, one or more security modules connected to the second communication module, and one or more processors connected to the first communication module and the second communication module. The one or more processors may be configured to receive NFC control data and transaction data for an NFC service from an external electronic device through the first communication module, to acquire an AID from the transaction data for an NFC service, to determine a security module corresponding to the AID of the security modules, to transmit the NFC control data and the transaction data for an NFC service to the security module through the second communication module, and to transmit a response signal received from the security module to the external electronic device through the first communication module.

According to an embodiment, the one or more security modules may include the one or more of the processors, a SIM, and an eSE.

According to an embodiment, the one or more processors may be configured to determine a security module corresponding to a previously acquired AID when an AID is not acquired from the transaction data for an NFC service.

According to an embodiment, the NFC control data and the transaction data for an NFC service may be transmitted to the security module through the RF gate.

According to an embodiment, the response signal may be provided to the one or more processors through the RF gate.

According to an embodiment, the one or more processors may be configured to establish a communication connection with the external electronic device through the first communication module, determine one or more applications to be allowed for relay transaction, create an AID list including the AIDs of the determined one or more applications, acquire one or more RF parameters for one or more security modules including the determined one or more applications through the second communication module, and transmit the created AID list and the acquired one or more RF parameters to the external electronic device through the first communication module.

According to an embodiment, an electronic device may include a first communication module configured to establish a communication connection through a first network, a second communication module configured to establish a communication connection through a second network, and one or more processors connected to the first communication module and the second communication module. The one or more processors may be configured to receive an AID list and one or more RF parameters from a first external electronic device through the second communication module, update a routing table of the first communication module based on the AID list, and update the RF parameter of the first communication module based on the one or more RF parameters.

According to an embodiment, the first communication module may be configured to establish a communication connection with a second external electronic device, using the updated RF parameter.

According to an embodiment, the one or more processors may be configured to acquire one or more AIDs from the AID list, recognize one or more security modules of the first external electronic device including applications corresponding to the one or more AIDs, determine at least some of the RF parameters based on the number of the recognized one or more security modules, and update the RF parameter of the first communication module, using the determined at least some of the RF parameters.

According to an embodiment, the one or more security modules may include one or more of one or more processors of the first external electronic device, the SIM of the first external electronic device, and the eSE of the first external electronic device.

According to an embodiment, the one or more processors may be configured to update the RF parameter of the first communication module, using the RF parameter for the SIM of the first external electronic device of the one or more RF parameters when a plurality of security modules has been recognized, and update the RF parameter of the first communication module, using the RF parameter for one recognized security module of the one or more RF parameters when one security module has been recognized.

According to an embodiment, the one or more processors may be configured to establish a communication connection with a second external electronic device through the first communication module, receive NFC control data and transaction data for an NFC service transmitted from the first external electronic device, through the first communication module, transmit at least some of the NFC control data and the transaction data for an NFC service to the first external electronic device through the second communication module, receive a response signal from the first external electronic device through the second communication module, and transmit the response signal to the second external electronic device through the first communication module.

According to an embodiment, the first communication module may be configured to create and provide NFC control data to the one or more processors when the transaction data for an NFC service is received from the first external electronic device.

Figure 4:
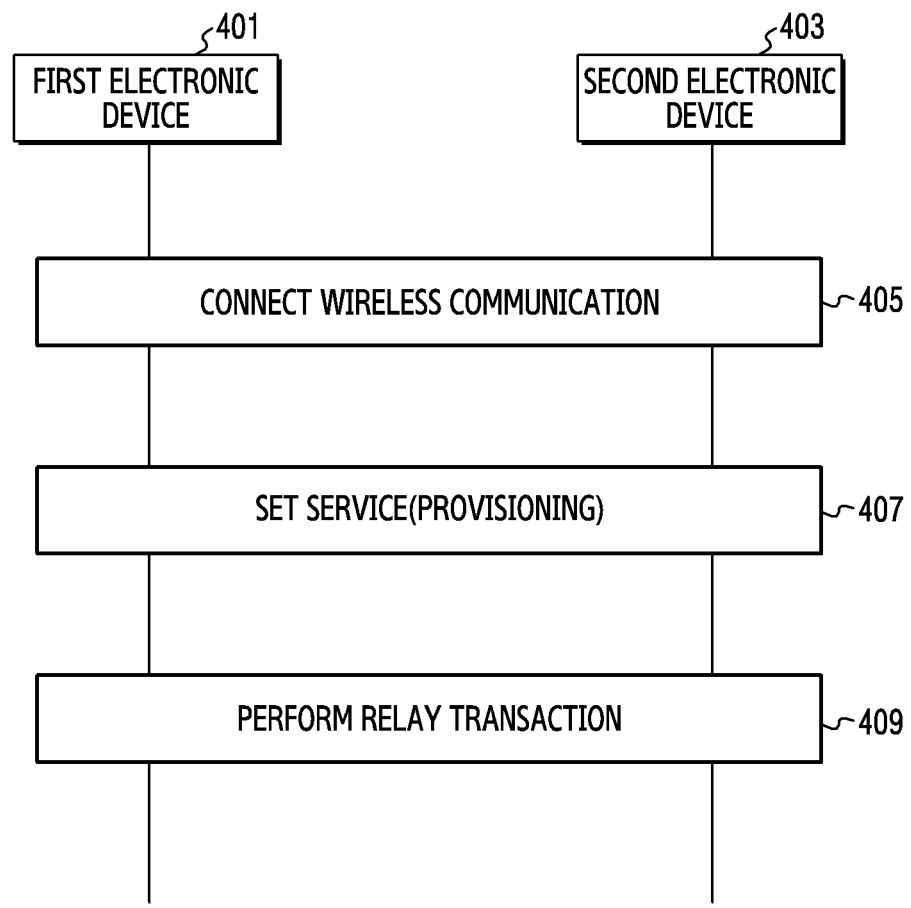
FIG. 4 is a flow diagram of a system that provides relay communication among electronic devices according to an embodiment.

FIG. 4 is a flow diagram of a system that provides relay communication among electronic devices according to an embodiment.

Referring to FIG. 4, in operation 405, a first electronic device 401 and a second electronic device 403 may establish a wireless communication connection. For example, the first electronic device 401 and the second electronic device 403 may establish a communication connection, using any one of Bluetooth, ZigBee, WiFi direction, or IrDA.

In operation 407, the first electronic device 401 and the second electronic device 403 may set a service (e.g., an NFC service) to be allowed for relay transaction. For example, the first electronic device 401 may determine one or more applications to be allowed for relay transaction from one or more applications supporting an NFC service based on the user input. The first electronic device 401 may transmit information related to the determined one or more applications (e.g., an AID list including the AIDs of the determined one or more applications and the RF parameters of security modules including the determined one or more applications) to the second electronic device 403. The second electronic device 403 may finish setting the service to be allowed for relay transaction by updating the RF parameter of the NFC communication module based on the information received from the first electronic device 401.

In operation 409, the first electronic device 401 and the second electronic device 403 may perform relay transaction. For example, the second electronic device 403 may establish a NFC communication connection (e.g., ISO 14443-4 protocol connection) with a third electronic device 105, using the updated RF parameter when approaching the third electronic device. When NFC communication connection with the third electronic device is established, the second electronic device 403 may receive transaction data for an NFC service from the third electronic device. The second electronic device 403 may create NFC control data in response to reception of the transaction data for an NFC service and transmit the created NFC control data and the received transaction data for an NFC service to the first electronic device 401. The first electronic device 401 may acquire an AID from the transaction data for an NFC service and provide the received information to a security module (e.g., the main processor 301, the SIM 307, and the eSE 309) including an application corresponding to the acquired AID. The first electronic device 401 may transmit a response signal created from the security module to the second electronic device 403. The second electronic device 403 may finish the relay transaction by transmitting the response signal received from the first electronic device 401 to the third electronic device, using NFC.

Figure 5:
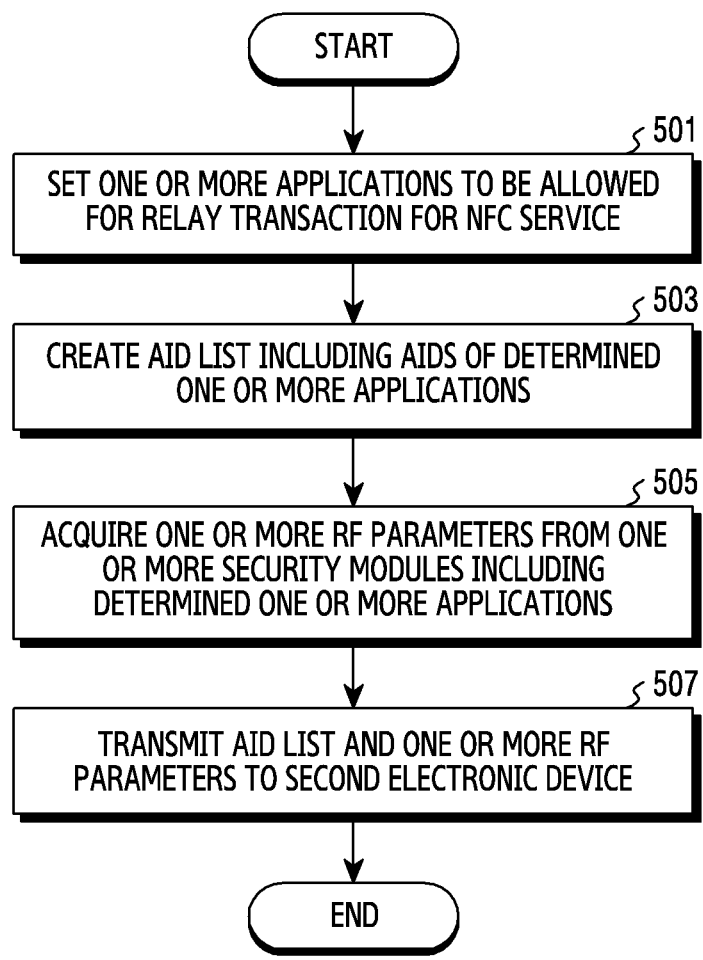
FIG. 5 is a flowchart of a method of performing service setting in a first electronic device according to an embodiment.
Figure 6:
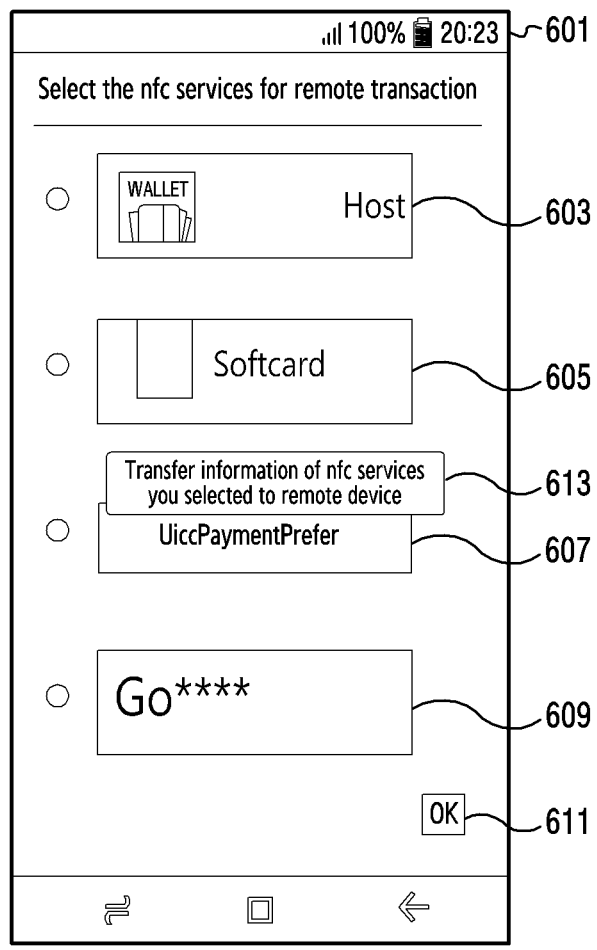
FIG. 6 is an illustration of an image for performing service setting in a first electronic device according to an embodiment.

FIG. 5 is a flowchart of a method of performing service setting in a first electronic device according to an embodiment. FIG. 6 is an illustration of an image for performing service setting in the first electronic device according to an embodiment.

Referring to FIGS. 5 and 6, in operation 501, a first electronic device 101 may determine (or set) one or more applications to be allowed for relay transaction of applications supporting an NFC service. For example, the processor of the first electronic device may execute a relay transaction control application for an NFC service based on the user input. The processor, as shown in FIG. 6, may control a display device 260 to display one or more applications (603, 605, 607, and 609) supporting the NFC service of applications installed in the first electronic device through the relay transaction control application for an NFC service. The processor when input for selecting one or more from the one or more applications 603, 605, 607, 609 displayed on a screen 601 of the first electronic device and input for selecting the OK icon 611 are received, one or more applications selected by the input may be determined as the applications to be allowed for relay transaction.

In operation 503, the first electronic device may create an AID list including the AIDs of the one or more applications determined to be allowed for relay transaction. For example, the processor may recognize the AIDs of the corresponding applications from one or more applications to be allowed for relay transaction. The processor may create the AID list based on the recognized AID. According to an embodiment, the created AID list, as shown in the following Table 1, may include a length field, an AID field, a comparison rule field, a location field, an application information field etc.

TABLE 1

| Length | AID | Comparison rule | Location | Application information |
|---|---|---|---|---|
| 0x06 | "A000000004" | Exact | HCE | ID card |
| 0x08 | "D4100000030001" | Longer | eSE | Credit card |
| 0x08 | "A0000000031010" | Shorter | SIM | Transportation card |
| 0x01 | "" | Longer | SIM | |

In Table 1 shown above, the length field may show the length of an AID. The comparison rule field may show a reference for determining whether the AID included in an AID list and an AID acquired from a signal (e.g., SELECT AID) that is transmitted from a third electronic device 105 are the same. For example, "Exact" may show that the AID included in an AID list and the AID acquired from a signal that is transmitted from the third electronic device should be exactly the same, "Longer" may show that the AID acquired from a signal that is transmitted from the third electronic device should start with the AID included in the AID list and should have a longer value, and "Shorter" may show that the AID acquired from a signal that is transmitted from the third electronic device should start with the AID included in the AID list and should have a shorter value.

In operation 505, the first electronic device may acquire one or more RF parameters for one or more security modules (e.g., the main processor 301, the SIM 307, and the eSE 309) including one or more applications determined to be allowed for relay transaction. For example, when the one or more applications determined to be allowed for relay transaction are included in the eSE 309 of a first electronic device, a processor may transmit a signal requesting one or more RF parameters for the eSE to an NFC communication module 305. The processor may receive one or more RF parameter (e.g., a type A RF parameter and a type B RF parameter) for the eSE from the NFC communication module. Each of the security modules, in accordance with the method defined in ETSI TS 102 622, includes a type A RF parameter as in the following Table 2 and a type B RF parameter as in the following, Table 3 and the NFC communication module may receive and store the type A RF parameter and the type B RF parameter from the security modules before receiving a signal requesting an RF parameter from the processor. According to an embodiment, the type A RF parameter and the type B RF parameter may further include information related to security modules corresponding to the RF parameters, respectively.

TABLE 2

| Identifier | Parameter | Access Right | Comment | Length | Default |
|---|---|---|---|---|---|
| '01' | MODE | RW | Type A card emulation enabled indicator | 1 | 'FF' |
| '02' | UID_REG | WO | UID as defined in ISO/IEC 14443-3 [6] for type A | $N_0 = 0, 4, 7, 10$ | $N_0 = n$ |
| '03' | SAK | RW | Preformatted SAK as defined in ISO/IEC 14443-3 [6] for type A | 1 | '00' |
| '04' | ATQA | RW | Preformatted ATQA; byte 1 shall contain b8 . . . 1, byte 2 b16 . . . 9 of the ATQA coded as defined in ISO/IEC 14443-3 [6] for type A | 2 | '0000' |

TABLE 2-continued

| Identifier | Parameter | Access Right | Comment | Length | Default |
|---|---|---|---|---|---|
| '05' | APPLICATION_DATA | RW | The historical bytes as defined in ISO/IEC 14443-4 [7] for type A | $N_1$ | $N_1 = 0$ |
| '06' | FWI, SFGI | RW | Frame waiting time and Start-up frame guard time as defined in ISO/IEC 14443-4 [7] for type A | 1 | 'EE' |
| '07' | CID SUPPORT | RW | support for CID as defined ISO/IEC 14443-4 [7] | 1 | '00' |
| '08' | CLT-SUPPORT | RO | Support of tunnelling mode for ISO/IEC 14443-4 [7] non compliant protocols | 1 | '00' |
| '09' | DATARATE MAX | RW | Maximum data rate supported | 3 | '030300' |

TABLE 3

| Identifier | Parameter | Access Right | Comment | Length | Default |
|---|---|---|---|---|---|
| '01' | MODE | RW | Type B card emulation enabled indicator | 1 | 'FF' |
| '02' | PUPI_REG | WO | PUPI as defined in ISO/IEC 14443-3 [6] for type B. | $N_0$ | $N_0 = 0$ |
| '03' | AFI | RW | Application family identifier as defined in ISO/IEC 14443-3 [6] for type B | 1 | '00' |
| '04' | ATQB | RW | Additional data for ATQB | 4 | See Table 31 |
| '05' | HIGHER_LEYER_RESPONSE | RW | Higher Layer response in answer to ATTRIB command as defined in ISO/IEC 14443-3 [6] for type B | $N_2$ | $N_2 = 0$ |
| '06' | DATARATE_MAX | RW | Maximum data rate supported | 3 | '030300' |

In operation 507, a first electronic device may transmit an AID list and one or more RF parameters to a second electronic device. For example, a processor may control a communication module 311 such that an AID list including the information in Table 1 above and one or more RF parameters including the information in Table 2 above or the information in Table 3 above are transmitted to a second electronic device. According to an embodiment, when an AID list and one or more RF parameters are transmitted from the second electronic device, the processor may control the display device such that notification information 609 showing that corresponding information has been transmitted to the second electronic device is displayed, as shown in FIG. 6. When an AID list and one or more RF parameters are transmitted to the second electronic device, the processor may control one or more of the sound output device 255 and the haptic module 279 such that one or more of alarm or vibration are outputted.

Figure 7:
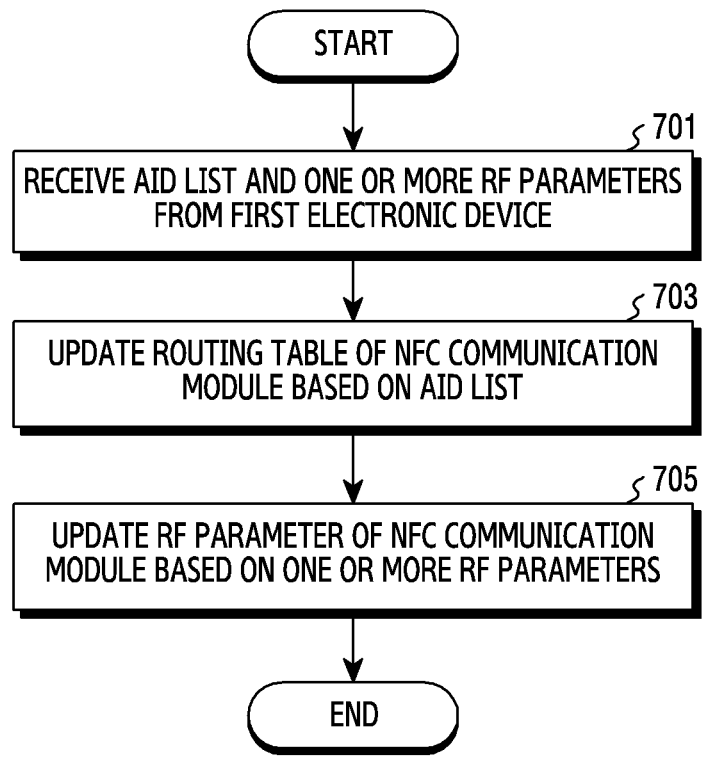
FIG. 7 is a flowchart of a method of performing service setting in a second electronic device according to an embodiment.
Figure 8:
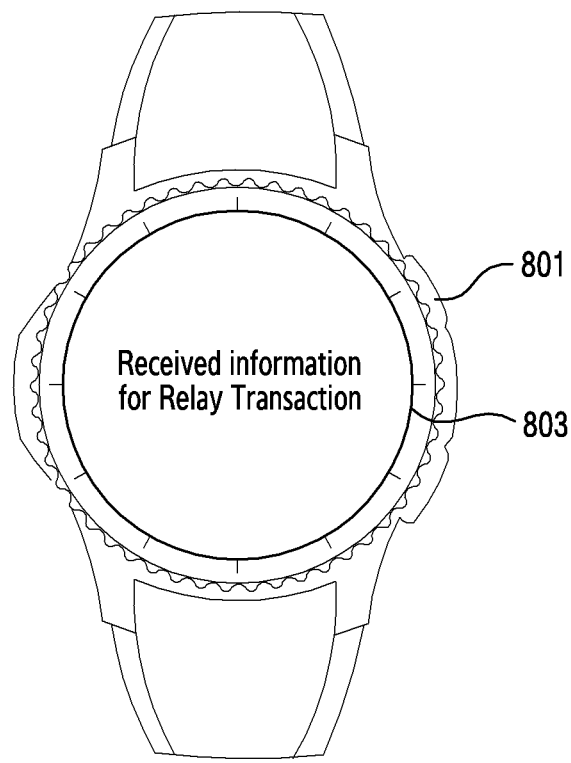
FIG. 8 is an illustration of a notification image showing that information related to service setting has been received in a second electronic device according to an embodiment.

FIG. 7 is a flowchart of a method of performing service setting in a second electronic device according to an embodiment. FIG. 8 is an illustration of a notification image showing that information related to service setting has been received in the second electronic device according to an embodiment.

Referring to FIGS. 7 and 8, in operation 701, a second electronic device 103 may receive an AID list and one or more RF parameters from a first electronic device 101 through a communication module 311. For example, the processor of a second electronic device may receive an AID list and one or more RF parameters (e.g., a type A RF parameter and/or a type B RF parameter for one or more security modules including one or more applications corresponding to one or more AIDs included in an AID list) from a first electronic device connected for NFC (e.g., Bluetooth, ZigBee, WiFi direct, and an IrDA standard) to the second electronic device through a communication module 311. The processor may store the received AID list and one or more RF parameters. According to an embodiment, when receiving an AID list and one or more RF parameters, as shown in FIG. 8, the processor may control a display device to display a notification image 803 on the screen of a second electronic device 801 or may control a sound output device 255 or a haptic module 279 to output an alarm or vibration. Accordingly, the user of the second electronic device may recognize that the AID list and the one or more RF parameters have been successfully received from the first electronic device.

In operation 703, the second electronic device may update the routing table of an NFC communication module 305 based on the received AID list. For example, the processor may reconfigure the AID list into an RF_SET_LISTEN_MODE_TOUTING_CMN format defined in an NFC Controller Interface (NCI) released by NFC-Forum and transmit the AID list to the NFC communication module. AIDs included in the RF_SET_LISTEN_MODE_TOUTING_CMN format, as in the following Table 4, may include a quality type field, length field, and a value field.

TABLE 4

| Qualifier Type | 1 Octet | Type and Qualifier |
|---|---|---|
| Length | 1 Octet | The length of Value (x) |
| Value | X Octet | Value of the Routing TLV |

In Table 4 above, the quality type field may show the types of an entry (e.g., an AID protocol or a technology) and may be 1 octet (e.g., values b7~b0). The types of an entry are determined by bit values b3 to b0 and, for the AID of the types of an entry, 0x02 may be used as the values of b3 to b0, as in the following Table 5. The values b6 to b4 are values showing the comparison rules included in an AID list and may be determined based on the comparison rule field of the AID list. For example, when the comparison rule field of an AID list is "Shorter," 1 may be used as the value b5.

TABLE 5

| | Bit Mask | | | | | | | | Description |
|---|---|---|---|---|---|---|---|---|---|
| | b7 | b6 | b5 | b4 | b3 | b2 | b1 | b0 | |
| Octet 0 | 0 | | | | | | | | RFU |
| | | X | | | | | | | If set, indicates that routing is blocked for the power modes where it is not supported. |
| | | | X | | | | | | Only applies to AID routing entries. If set, indicates a match is allowed when the SELECT AID is shorter than the AID in this routing table entry. |
| | | | | X | | | | | Only applies to AID routing entries. If set, indicates a match is allowed when the SELECT AID is longer than the AID in this routing table entry. |
| | | | | | 0 | 0 | 1 | 0 | Listen Mode Routing Entry Type. |

In Table 4 above, the length field may show the length of the value field (e.g., the number of octets). The value field is configured in a Type Length Value (TVL) format and, when the quality type field is an AID, for example, it may be configured as in the following Table 6.

TABLE 6

| Payload Field(s) | Length | Value/Description |
|---|---|---|
| Route | 1 Octet | An NFCEE ID |
| Power State | 1 Octet | See Below Table |
| AID | 0-16 Octets | Application Identifier |

In Table 6, "Route" may be set as the ID value of a security module corresponding to AID and AID may be set as the value of an AID in an AID list. "Power State" is a value set to determine whether AIDs are matched only when the power state of an electronic device satisfies a certain condition, and for example, may be configured in the formats as in the following Table 7.

TABLE 7

| | Bit Mask | | | | | | | | Description |
|---|---|---|---|---|---|---|---|---|---|
| | b7 | b6 | b5 | b4 | b3 | b2 | b1 | b0 | |
| | 0 | 0 | | | | | | | RFU |
| | | | X | | | | | | Applies to Switched On Sub_State 3 if the bit is equal to 1b. Otherwise it does not apply to Switched On Sub_State 3. |
| | | | | X | | | | | Applies to Switched On Sub_State 2 if the bit is equal to 1b. Otherwise it does not apply to Switched On Sub_State 2. |
| | | | | | X | | | | Applies to Switched On Sub_State 1 if the bit is equal to 1b. Otherwise it does not apply to Switched On Sub_State 1. |
| | | | | | | X | | | Applies to Battery Off State if the bit is equal to 1b. Otherwise it does not apply to Battery Off State. |
| | | | | | | | x | | Applies to Switched Off State if the but is equal to 1b. Otherwise it does not apply to Switched Off State. |
| | | | | | | | | X | Applies to Switched On State if the bit is equal to 1b. Otherwise it does not apply to Switched On State. |

An NFC communication module may update a routing table, using data (e.g., data reconfigured in a RF_SET_LISTEN_MODE_TOUTING_CMN format) received from a processor. For example, when a relay transaction control application for an NFC service is executed in a second electronic device, the NFC communication module may register data received from the processor on the routing table.

In operation 705, the second electronic device may update the RF parameter of the NFC communication module based on the one or more RF parameters. For example, when the relay transaction control application for an NFC service is executed, the processor may recognize the security module of the first electronic device including an application corresponding to the AID included in an AID list. When the security module of the first electronic device including the application corresponding to an AID is the eSE 309 of the first electronic device, the processor may recognize an RF parameter (e.g., a type A RF parameter and/or a type B RF parameter) for the eSE from one or more received RF parameters. The processor may update the RF parameter of the NFC communication module to the RF parameter for the eSE of the first electronic device. When the first electronic device has a plurality of security modules of the first electronic device including an AID, the processor may recognize the RF parameter for the SIM of the first electronic device from one or more received RF parameters. The processor may update the RF parameter of the NFC communication module of the second electronic device to the RF parameter for the SIM 307 of the first electronic device. According to an embodiment, when the RF parameter of the SIM of the first electronic device is not recognized from one or more received RF parameters, the processor may recognize the RF parameter for the eSE of the first electronic device from the one or more received RF parameters. The processor may update the RF parameter of the NFC communication module of the second electronic device to the RF parameter for the eSE of the first electronic device. When the RF parameter of the SIM of the first electronic device and the RF parameter for the eSE of the first electronic device are not recognized from one or more received RF parameters, the processor may not update the RF parameter of the NFC communication module of the second electronic device.

Figure 9:
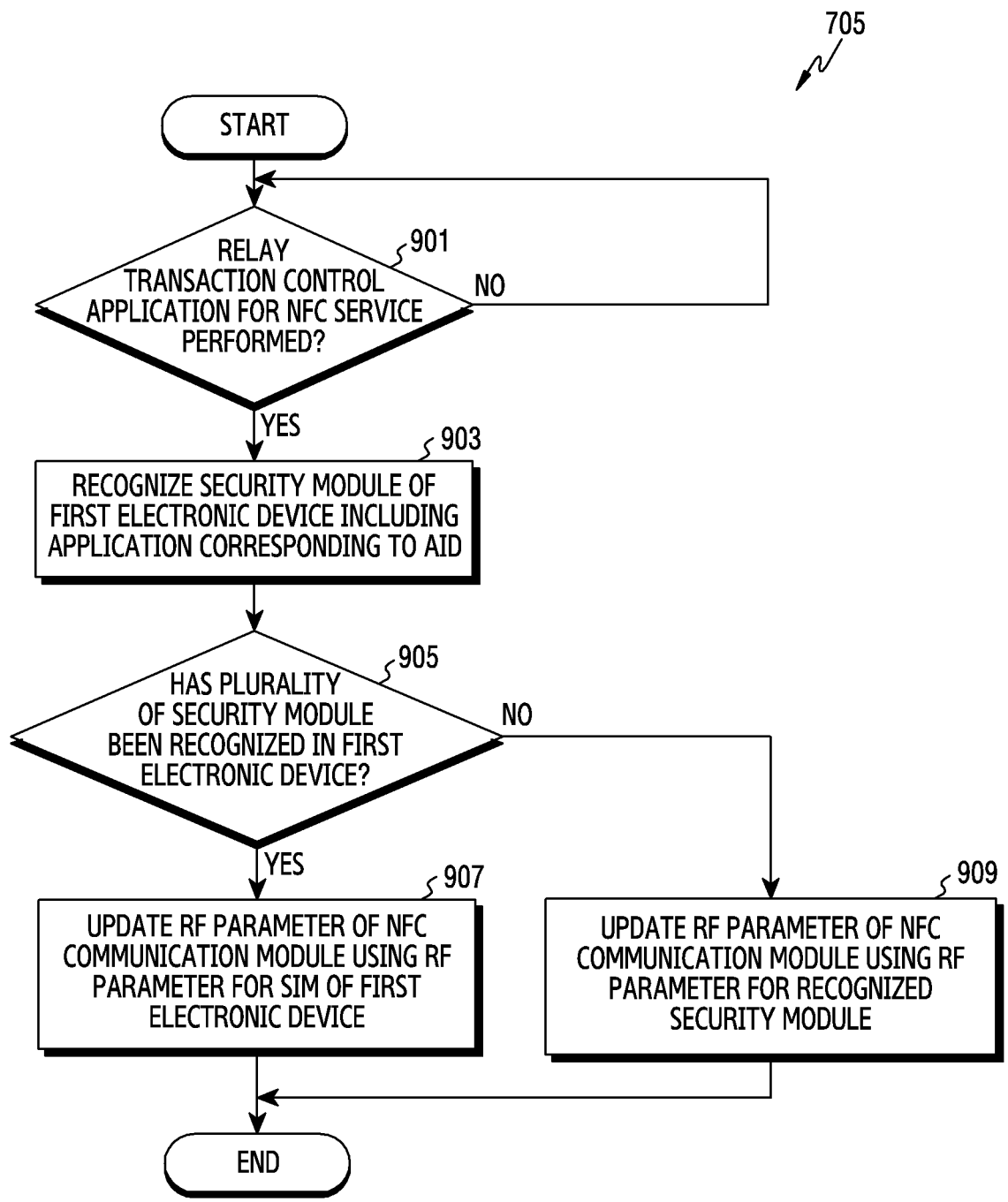
FIG. 9 is a flowchart of a method of updating an RF parameter of an NFC communication module in a second electronic device according to an embodiment.

FIG. 9 is a flowchart of a method of updating an RF parameter of an NFC communication module in a second electronic device according to an embodiment.

Referring to FIG. 9, in operation 901, a second electronic device 103 may determine whether relay transaction control application for an NFC service is executed (or performed). For example, the processor of the second electronic device may determine whether input for executing a relay transaction control application for a NFC service is detected from one or more of a display device 260 and an input device 250. Alternatively, the processor may determine whether a relay transaction control application for a NFC service is being executed in the second electronic device.

In operation 903, the second electronic device may recognize a security module of a first electronic device including an application corresponding to an AID based on the AID list received from the first electronic device. For example, the processor may recognize one or more security modules corresponding to one or more AIDs included in a received AID list from the AID list. For example, the processor may recognize that the AIDs included in an AID list are included in the eSE 309 of the first electronic device by recognizing the location field of the AID list. Alternatively, the processor may recognize that an AID included in an AID list is included in the eSE and the SIM 307 of the first electronic device by recognizing the location field of the received AID list.

In operation 905, the second electronic device may determine whether a plurality of security modules has been recognized in the first electronic device. For example, when AIDs included in an AID list are all included in the eSE of the first electronic device, the processor may determine that one security module has been recognized in the first electronic device. Alternatively, when AIDs included in an AID list are respectively included in the eSE and the SIM of the first electronic device, the processor may determine that a plurality of security modules have been recognized in the first electronic device.

In operation 907, when a plurality of security modules has been recognized in the first electronic device, the second electronic device may update the RF parameter of the NFC communication module of the second electronic device, using the RF parameter for the SIM of the first electronic device. For example, the processor may recognize the RF parameter of the SIM of the first electronic device from one or more RF parameters received from the first electronic device. The processor may update the RF parameter of the NFC communication module of the second electronic device to the RF parameter for the SIM of the first electronic device. The SIM of the first electronic device may have one or more of a type A RF parameter and a type B RF parameter. Accordingly, when there are both a type A RF parameter and a type B RF parameter for the SIM of the first electronic device, the processor may update the RF parameter of the NFC communication module so that the NFC communication module may use both the type A RF parameter and the type B RF parameter for the SIM of the first electronic device. According to an embodiment, when the RF parameter for the SIM of the first electronic device is not included in one or more RF parameters received from the first electronic device, the processor may determine whether the RF parameter for the eSE of the first electronic device is included in the one or more RF parameters received from the first electronic device. When the RF parameter for the eSE of the first electronic device is included in the one or more RF parameters received from the first electronic device, the processor may update the RF parameter of the NFC communication module of the second electronic device to the RF parameter for the eSE of the first electronic device. When the RF parameter for the eSE of the first electronic device is not included in the one or more RF parameters received from the first electronic device, the processor may not update the RF parameter of the NFC communication module of the second electronic device.

In operation 909, when one security module has been recognized in the first electronic device, the processor of the second electronic device may update the RF parameter of the NFC communication module of the second electronic device, using the RF parameter for the recognized security module of the first electronic device. For example, the processor may recognize the RF parameter of the eSE of the first electronic device from one or more RF parameters when the security module of the recognized first electronic device is an eSE. The processor may update the RF parameter of the NFC communication module of the second electronic device to the RF parameter for the eSE. The eSE of the first electronic device may have a type A RF parameter and a type B RF parameter. Accordingly, the processor may update the RF parameter of the NFC communication module so that that the NFC communication module may use both the type A RF parameter and the type B RF parameter for the eSE of the first electronic device.

According to an embodiment, the second electronic device may change the application to be allowed for relay transaction based on the user input. For example, the processor of the second electronic device may control a display device to display one or more AIDs included in an AID list received from the first electronic device through a relay transaction control application for an NFC service. When input for checking or unchecking at least some of the displayed one or more AIDs is received, the processor may perform operations 903 to 909 in consideration of only the AIDs checked by the user input.

Figure 10:
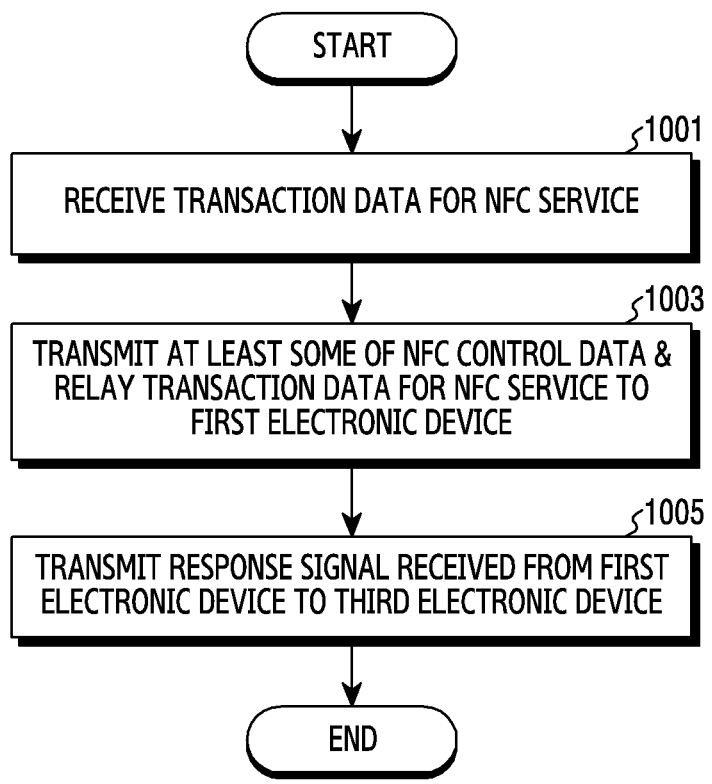
FIG. 10 is a flowchart of a method of performing relay transaction in a second electronic device according to an embodiment.

FIG. 10 is a flowchart of a method of performing relay transaction in the second electronic device according to an embodiment.

Referring to FIG. 10, in operation 1001, a second electronic device 103 may receive transaction data for an NFC service from a third electronic device 105. For example, when the second electronic device approaches the third electronic device, the NFC communication module 305 of the second electronic device may sense an NFC RF field that is created by the third electronic device. The NFC communication module may create and provide first control data (e.g., EVT_FIELD_ON (enter in an NFC RF field) and EVT_FIELD_OFF (separation of a third electronic device from RF field)) to a processor (e.g., the main processors 221 and 301) in response to sensing of the NFC RF field created by the third electronic device. When the second electronic device stably enters the NFC RF field of the third electronic device, the NFC communication module may connect the third electronic device in accordance with the ISO 14443-4 protocol, using an RF parameter. The RF parameter used to connect the third electronic device in accordance with the ISO 14443-4 protocol may have been updated based on the RF parameters of the security modules of the first electronic device connected to the second electronic device through NFC (e.g., Bluetooth, ZigBee, WiFi direct, and an IrDA standard). When the third electronic device is connected in accordance with the ISO 14443-4 protocol, the NFC communication module may create and transmit second control data (e.g., EVT CARD ACTIVATED) to the processor and may receive transaction data for an NFC service transmitted from the third electronic device. According to an embodiment, the transaction data for an NFC service may be an APDU format defined by EMVCo.

In operation 1003, the second electronic device may transmit at least some of the NFC control data and the transaction data for an NFC service to the first electronic device. For example, the NFC communication module may extract an AID from the data (e.g., SELECT AID) that has been received before the transaction data for an NFC service is received from the third electronic device. When the extracted AID is included in a routing table of the NFC communication module, the NFC communication module may transmit the transaction data for an NFC service received from the third electronic device to a processor. When receiving the NFC control data (e.g., first control data and second control data) and the transaction data for an NFC service from the NFC communication module, the processor may transmit at least some of the NFC control data and the transaction data for an NFC service to the first electronic device through a communication module. For example, the processor may transmit both the NFC control data and the transaction data for an NFC service to the first electronic device through a communication module. Alternatively, the processor may transmit only the transaction data for an NFC service to the first electronic device through a communication module.

In operation 1005, the second electronic device may transmit a response signal received from the first electronic device to the third electronic device. For example, the processor may receive a response signal to the transaction data for an NFC service transmitted to the first electronic device from the first electronic device through a communication module. The processor may control the NFC communication module such that the received response signal is transmitted to the third electronic device.

Figure 11:
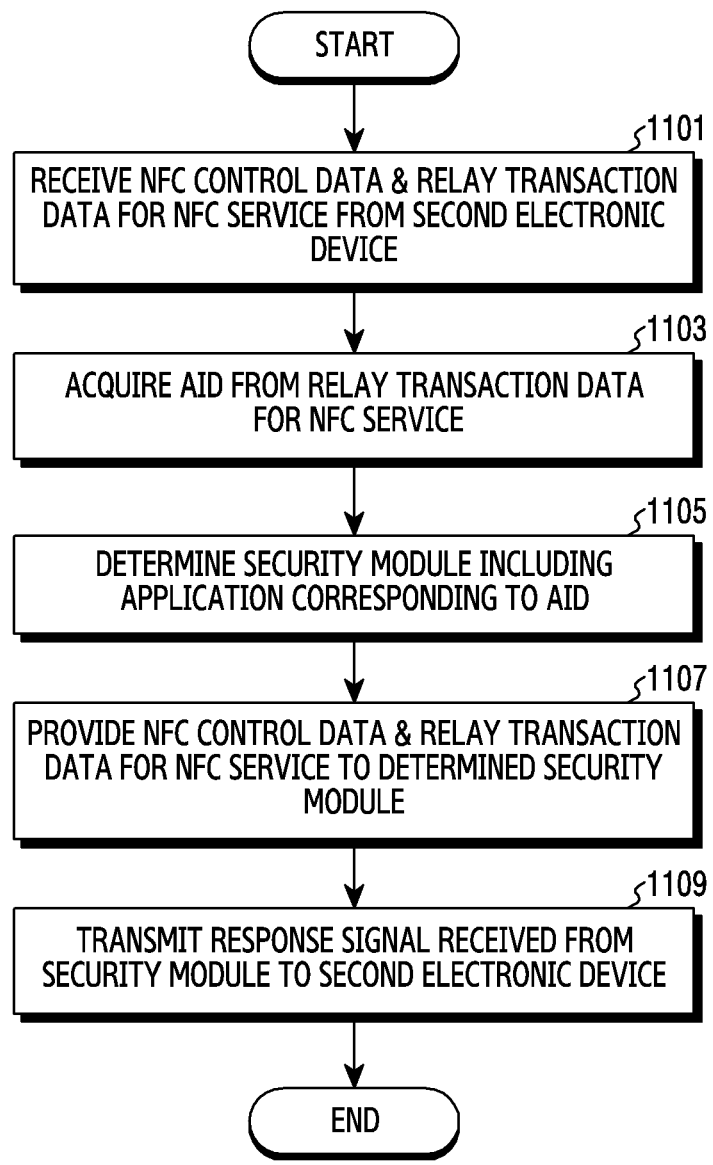
FIG. 11 is a flowchart of a method of performing relay transaction in a first electronic device according to an embodiment.

FIG. 11 is a flowchart of a method of performing relay transaction in the first electronic device according to an embodiment.

Referring to FIG. 11, in operation 1101, a first electronic device 101 may receive NFC control data and relay transaction data for an NFC service from a second electronic device 103. For example, the processor of the first electronic device may receive NFC control data and relay transaction data for an NFC service from the second electronic device through a communication module 311. According to an embodiment, the NFC control data may be received sooner than the relay transaction data for an NFC service.

In operation 1103, the first electronic device may acquire an AID from the received relay transaction data for an NFC service. For example, the processor may acquire an AID from the data (e.g., SELECT AID) that has been received before the relay transaction data for an NFC service is received from the second electronic device.

In operation 1105, the first electronic device may determine a security module corresponding to the acquired AID. For example, the processor, as in the following Table 8, may determine a security module corresponding to the AID, using a routing table included in a relay transaction control application for an NFC service of the first electronic device.

TABLE 8

| AID | Comparison rule | Location |
| --- | --- | --- |
| "A000000004" | Exact | HCE |
| "D4100000030001" | Longer | eSE |
| "A0000000031010" | Shorter | SIM |
| "" | Longer | SIM |

In operation 1107, the first electronic device may provide NFC control data and relay transaction data for an NFC service to the determined security module. For example, the processor may process the received NFC control data and relay transaction data for an NFC service received from the first electronic device into a format shown in the following Table 9 and then transmit the data to the NFC communication module.

TABLE 9

| Security module | Kind of data | Length | Data |
| --- | --- | --- | --- |
| SIM | Control data | 0x05 | EVT_FIELD_OFF |
| SIM | APDU (Transaction data) | 0x10 | 'SELECT AID' |
| eSE | APDU (Transaction data) | 0x08 | 'GPO' |
| eSE | Control data | 0x08 | EVT_CARD_ACTIVATED |

When receiving data of the format shown in Table 9 above from the processor, the NFC communication module may recognize the security module (e.g., a processor, a SIM, and an eSE) to which data is transmitted from the security module field of the received data. Further, the NFC communication module may recognize the kind of data based on the data kind field of the received data. Further, the NFC communication module may acquire the NFC control data and the transaction data for an NFC service as much as the length value of the length field of the received data. The NFC communication module may transmit the acquired control data and transaction data to the security module recognized through an RF gate. According to an embodiment, the NFC control data may be transmitted in a host controller interface (HCI) format defined by ETSI TS 102 622 and the transaction data for an NFC service may be transmitted using a command EVT_SEND_DATA of ETSI TS 102 622.

In operation 1109, the first electronic device may transmit a response signal received from the security module to the second electronic device. For example, the security module may generate a response signal to the NFC control data and the relay transaction data for an NFC service received through the RF gate and then transmit the created response signal to the NFC communication module through the RF gate. The NFC communication module may transmit the response signal transmitted from the security module to the processor. The processor may transmit the response signal received from the NFC communication module to the second electronic device through a communication module.

Although a first electronic device receives NFC control data and relay transaction data for an NFC service from a second electronic device in the above description, according to an embodiment, the first electronic device may receive only the relay transaction data for an NFC service from the second electronic device. In this case, when receiving the relay transaction data for an NFC service from the second electronic device, the first electronic device may create NFC control data performing the same function as the NFC control data when NFC control data is received from the second electronic device.

Although a security module receives NFC control data and relay transaction data for an NFC service from an NFC communication module through an RF gate in the above description, according to an embodiment, the security module may receive the NFC control data and transaction data for an NFC service from the NFC communication module through an APDU gate.

Although the data received first of transaction data for an NFC service received from a second electronic device was only SELECT AID in the above description, according to an embodiment, the data received before relay transaction data for an NFC service is received from a second electronic device may not be the SELECT AID. In this case, the processor of the first electronic device may use the most recently received SELECT AID.

Although the processor of a second electronic device provides received NFC control data and relay transaction data for an NFC service to an NFC communication module in the above description, according to an embodiment, the processor may create a response signal without transmitting data to the NFC communication module when a security module corresponding to an AID acquired from the transaction data for an NFC service is the processor.

According to an embodiment, a method of performing relay communication in an electronic device may include receiving NFC control data and relay transaction data for an NFC service from an external electronic device through the first communication module; acquiring an AID from the transaction data for an NFC service; determining a security module corresponding to the AID from one or more security modules of the electronic device; transmitting the NFC control data and relay transaction data for an NFC service to the security module through a second communication module of the electronic device; and transmitting a response signal received from the security module to the external electronic device through the first communication module.

According to an embodiment, the one or more security modules may include one or more of one or more processors, a SIM, and an eSE.

According to an embodiment, the method of performing relay communication in an electronic device may further include determining a security module corresponding to a previously acquired AID when an AID is not acquired from the transaction data for an NFC service.

According to an embodiment, the NFC control data and the transaction data for an NFC service may be transmitted to the one or more security modules through an RF gate.

According to an embodiment, the response signal may be provided to one or more processors of the electronic device through the RF gate.

According to an embodiment, the method of performing relay communication in an electronic device may further include establishing a communication connection with the external electronic device through the first communication module; determining one or more applications to be allowed for relay transaction; creating an AID list including the AIDs of the determined one or more applications; acquiring one or more RF parameters for one or more security modules including the determined one or more applications through the second communication module; and transmitting the created AID list and the acquired one or more RF parameters to the external electronic device through the first communication module.

According to an embodiment, determining one or more applications to be allowed for relay transaction may include displaying one or more applications supporting an NFC service and installed in the electronic device; and determining one or more applications selected by user input from the displayed one or more applications as one or more applications to be allowed for relay transaction.

According to an embodiment, the method of performing relay communication in an electronic device may include receiving an AID list and one or more RF parameters from a first external electronic device through a first communication module of the electronic device; updating a routing table of the first communication module based on the AID list; and updating the RF parameter of the first communication module based on the one or more RF parameters.

According to an embodiment, the method of performing relay communication in an electronic device may further include establishing a communication connection with a second external electronic device (e.g., the third electronic device 105), using the updated RF parameter.

According to an embodiment, updating the RF parameter of the first communication module may include acquiring one or more AIDs from the AID list; recognizing one or more security modules of the first external electronic device including applications corresponding to the one or more AIDs; determining at least a portion of the one or more RF parameters based on the number of the recognized one or more security modules; and updating the RF parameter of the first communication module, using the determined at least a portion of the RF parameters.

According to an embodiment, the one or more security modules may include one or more of one or more processors of the first external electronic device, the SIM of the first electronic device, and the eSE of the first electronic device.

According to an embodiment, updating the RF parameter of the first communication module may include when a plurality of security modules has been recognized, updating the RF parameter of the first communication module, using an RF parameter of the SIM of the first external electronic device of the one or more parameters; and when one security module has been recognized, updating the RF parameter of the first communication module, using an RF parameter for the recognized one security module of the one or more RF parameters.

According to an embodiment, the method of performing relay communication in an electronic device may further include establishing a communication connection with a second external electronic device through the first communication module; receiving NFC control data and transaction data for an NFC service transmitted from the first external electronic device, through the first communication module; transmitting at least some of the NFC control data and the transaction data for an NFC service to the first external electronic device through the second communication module; receiving a response signal from the first external electronic device through the second communication module; and transmitting the response signal to the second external electronic device through the first communication module.

According to an embodiment, the method of performing relay communication in an electronic device may further include creating and providing NFC control data to the one or more processors by means of the first communication module when the transaction data for an NFC service is received from the first external electronic device.

The electronic devices according to the various embodiments described herein may be various electronic devices. The electronic device, for example, may include one or more of a mobile communication device (e.g., a smartphone), a computer device, a mobile multimedia device, a mobile medical device, a camera, a wearable device, and an appliance. The electronic device according to one embodiment of the present disclosure is not limited to the above described devices.

The embodiments and the terms used herein are not intended to limit the present disclosure to certain forms, but should be understood to include various modifications, equivalents, and/or alternatives to the corresponding embodiments. In describing the accompanying drawings, similar reference numerals may be used to designate similar elements. A singular expression may include a plural expression unless they are definitely different in a context. The terms "A or B", "one or more of A and/or B", "A, B, or C", and "one or more of A, B and/or C" may include all possible combinations of the elements. The expression "a first", "a second", "the first", and "the second" used in the present disclosure may modify various components regardless of the order and/or the importance but does not limit the corresponding components. When an element (e.g., a first element) is referred to as being "(functionally or communicatively) connected," or "directly coupled" to another element (e.g., a second element), the element may be connected directly to the other element or connected to the other element through yet another element (e.g., a third element).

The term "module" as used herein may include a unit consisting of hardware, software, or firmware, and may, for example, be used interchangeably with the terms "logic", "logical block", "component", "circuit", and the like. The term "module" may be an integrated component, or a minimum unit for performing one or more functions or a part thereof. For example, a module may be an application specific integrated circuit (ASIC).

Various embodiments of the present disclosure may be implemented by software including instructions stored in machine-readable (e.g., computer-readable) storage media. The machine, which is a device that may call for stored instructions from a storage medium and may operate in accordance with the called instructions, may include an electronic device according to the embodiments described herein. When the commands are executed by a processor, the processor may perform the functions corresponding to the command directly or using other components that are controlled by the processor. The commands may include code that is created or executed by a compiler or an interpreter. The machine-readable storage media may be provided in a non-transitory storage medium type. The term 'non-transitory' only indicates that a storage medium does not include a signal and is tangible without considering whether data is semi-permanently or temporarily stored in a storage medium.

According to an embodiment, the method according to the various embodiments disclosed herein may be included in a computer program product. The computer program product may be traded between a seller and a purchaser as an item. The computer program product may be distributed in the type of a device-readable storage medium (e.g., a compact disc read only memory (CD-ROM) or through an application store (e.g., Play Store™) on the web. When the computer program product is distributed on the web, at least a portion of the computer program product may be at least temporarily stored or created in a storage medium such as the memory of the server of the manufacturer, the server of an application store, or a relay server.

Components (e.g., a module or a program) according to various embodiments may be single units or may be composed of various elements, and some of corresponding sub-components may be omitted or other sub-components may be further included in various embodiments. Generally or additionally, some components (e.g., a module or a program) may be integrated in a single unit and perform similarly or in the same way as the functions of the components before they are integrated. Operations performed by a module, a programming module, or other elements according to various embodiments may be executed sequentially, in parallel, repeatedly, or in a heuristic manner. At least some operations may be executed according to another sequence, may be omitted, or may further include other operations.

While the present disclosure has been shown and described with reference to certain embodiments thereof, it will be understood by those skilled in the art that various changes in form and details may be made therein without departing from the scope of the present disclosure as defined by the appended claims and their equivalents.

What is claimed is:
1. An electronic device, comprising:
a first communication circuit configured to establish a communication connection, using a first network;
a second communication circuit configured to establish a communication connection, using a second network;
one or more security modules connected to the second communication circuit; and
one or more processors connected to the first communication circuit and the second communication circuit,
wherein the one or more processors are configured to:

receive near field communication (NFC) control data and transaction data for an NFC service from an external electronic device through the first communication circuit, acquire an application identifier (AID) from the transaction data for the NFC service, determine a security module corresponding to the AID from the one or more security modules, transmit the NFC control data and the transaction data for the NFC service to the security module corresponding to the AID from the one or more security modules through the second communication circuit, and transmit a response signal received from the security module corresponding to the AID from the one or more security modules to the external electronic device through the first communication circuit.

2. The electronic device of claim 1, wherein the one or more security modules include one or more of the one or more processors, a subscriber identification module (SIM), and an embedded secure element (eSE).

3. The electronic device of claim 1, wherein the one or more processors are further configured to determine a security module corresponding to a previously acquired AID when the AID is not acquired from the transaction data for the NFC service.

4. The electronic device of claim 1, further comprising a radio frequency (RF) gate through which the NFC control data and the transaction data for the NFC service are transmitted to the security module corresponding to the AID from the one or more security modules.

5. The electronic device of claim 1, wherein the response signal is provided to the one or more processors through a radio frequency (RF) gate.

6. The electronic device of claim 1, wherein the one or more processors are further configured to:
establish a communication connection with the external electronic device through the first communication circuit,
determine one or more applications to be allowed for relay transaction,
create an AID list including AIDs of the determined one or more applications,
acquire one or more radio frequency (RF) parameters for one or more security modules including the determined one or more applications through the second communication circuit, and
transmit the created AID list and the acquired one or more RF parameters to the external electronic device through the first communication circuit.

7. An electronic device, comprising:
a first communication circuit configured to establish a communication connection, using a first network;
a second communication circuit configured to establish a communication connection, using a second network; and
one or more processors connected to the first communication circuit and the second communication circuit,
wherein the one or more processors are configured to:
receive an application identifier (AID) list and one or more radio frequency (RF) parameters from a first external electronic device through the second communication circuit,
update a routing table of the first communication circuit based on the AID list, and
update an RF parameter of the first communication circuit based on the one or more RF parameters.

8. The electronic device of claim 7, wherein the first communication circuit is further configured to establish a communication connection with a second external electronic device, using the updated RF parameter.

9. The electronic device of claim 8, wherein the one or more processors are further configured to:
acquire one or more AIDs from the AID list,
recognize one or more security modules of the first external electronic device including applications corresponding to the one or more AIDs,
determine at least a portion of the one or more RF parameters based on a number of the recognized one or more security modules, and
update the RF parameter of the first communication circuit, using the determined at least a portion of the one or more RF parameters.

10. The electronic device of claim 9, wherein the one or more security modules include one or more of one or more processors of the first external electronic device, a subscriber identification module (SIM) of the first external electronic device, and an embedded secure element (eSE) of the first external electronic device.

11. The electronic device of claim 9, wherein the one or more processors are further configured to:
update the RF parameter of the first communication circuit, using an RF parameter for a subscriber identification module (SIM) of the first external electronic device of the one or more RF parameters when a plurality of security modules is recognized, and
update the RF parameter of the first communication circuit, using an RF parameter for a recognized security module of the one or more RF parameters when one security module is recognized.

12. The electronic device of claim 7, wherein the one or more processors are further configured to:
establish a communication connection with a second external electronic device through the first communication circuit,
receive NFC control data and transaction data for an NFC service transmitted from the first external electronic device, through the first communication circuit,
transmit at least some of the NFC control data and the transaction data for the NFC service to the first external electronic device through the second communication circuit,
receive a response signal from the first external electronic device through the second communication circuit, and
transmit the response signal to the second external electronic device through the first communication circuit.

13. The electronic device of claim 12, wherein the first communication circuit is further configured to create and provide NFC control data to the one or more processors when the transaction data for the NFC service is received from the second external electronic device.

14. A method of performing relay communication in an electronic device, the method comprising:
receiving near field communication (NFC) control data and relay transaction data for an NFC service from an external electronic device through a first communication circuit of the electronic device;
acquiring an application identifier (AID) from the transaction data for the NFC service;
determining a security module corresponding to the AID of one or more security modules of the electronic device;
transmitting the NFC control data and the transaction data for the NFC service to the security module corresponding to the AID of the one or more security modules of the electronic device through a second communication circuit of the electronic device; and transmitting a response signal received from the security module corresponding to the AID of the one or more security modules of the electronic device to the external electronic device through the first communication circuit.

15. The method of claim 14, wherein the one or more security modules include one or more of the one or more processors, a subscriber identification module (SIM), and an embedded secure element (eSE).

16. The method of claim 14, further comprising determining a security module corresponding to a previously acquired AID when the AID is not acquired from the transaction data for the NFC service.

17. The method of claim 14, wherein the NFC control data and the transaction data for the NFC service are transmitted to the one or more security modules through a radio frequency (RF) gate.

18. The method of claim 14, wherein the response signal is provided to the one or more processors of the electronic device through a radio frequency (RF) gate.

19. The method of claim 14, further comprising:
establishing a communication connection with the external electronic device through the first communication circuit;
determining one or more applications to be allowed for relay transaction;
creating an AID list including AIDs of the determined one or more applications;
acquiring one or more radio frequency (RF) parameters for one or more security modules including the determined one or more applications through the second communication circuit; and
transmitting the created AID list and the acquired one or more RF parameters to the external electronic device through the first communication circuit.

20. The method of claim 19, wherein determining the one or more applications to be allowed for the relay transaction comprises:
displaying one or more applications supporting the NFC service that are installed in the electronic device; and
determining one or more applications selected by user input from the displayed one or more applications as one or more applications to be allowed for relay transaction.

* * * * *